2,937,094
PROCESS OF CURING MEATS AND COMPOSITION THEREFOR

Virgil R. Rupp, Maxwell C. Brockmann, and Lloyd W. Nicholson, Indianapolis, Ind., assignors to Hygrade Food Products Corporation, Detroit, Mich., a corporation of New York No Drawing. Application January 23, 1957
Serial No. 635,611

10 Claims. (Cl. 99—159)

This invention relates to a novel composition for curing meats and more particularly it pertains to a curing operation which results in a meat product having exceptional organoleptic qualities, texture and color.

Presently, some curing operations involve the use of a phosphate for retention of moisture in meats. The phosphates previously suggested for this purpose are molecularly dehydrated phosphates having a $R_2O$ to $P_2O_5$ ratio of not more than 1.7:1 and exemplified by sodium tripolyphosphate; disodium phosphate; trisodium phosphate; etc. While these phosphates are somewhat effective in water retention, it is noted that meat products containing the same have an intensified color which creates an artificial appearance. Further, the organoleptic qualities of the meat are not as good as desired because for some unexplainable reason the phosphates do affect the flavor or taste of meat. Another significant disadvantage resulting from the use of heretofore known phosphates is that meat acquires a gelatinous characteristic of rawness even though it has been cooked. As a result of the disadvantages just mentioned, investigations are being conducted in order to improve meat curing operations. It is our purpose to show how the disadvantages in using conventional phosphates can be overcome.

Therefore it is an object in this invention to provide a novel composition in curing meats.

Another object of this invention is to provide a curing operation which is especially adapted to produce cured meats having exceptional organoleptic qualities.

Still another object of this invention is to provide a meat curing operation which results in a meat product having an exceptional texture.

Another object of this invention is to provide a cured meat having a natural color, that is, being substantially free of the intensified color which is characteristic of some conventional phosphates.

Other objections and advantages of this invention will become apparent from the following description and explanation thereof.

Meat is treated in accordance with this invention by means of a composition containing a nitrite suitable for color fixation, and a mixture of a pyrophosphate and an orthophosphate having a $R_2O$ to $P_2O_5$ ratio of about 2.45 to 2.60:1, wherein R is selected from sodium, potassium and hydrogen and which composition has a pH of about 6 to 7.5. The anhydrous salts are used in calculating this ratio. Beef, pork, mutton, veal, etc. can be cured by the method of this invention. More specifically smoked hams, canned hams, butts, picnics, loins are improved measurably by employing the curing composition described above.

The mixture of phosphates which is employed in the curing composition contains a pyrophosphate and an orthophosphate. For the purpose of this specification and the appended claims "pyrophosphate" is intended to designate the acid pyrophosphates or the completely neutralized salts. The phosphate mixture must contain sufficient cationic radicals to bring the pH within the desired range. The cationic radical of the pyrophosphate can be sodium or potassium. Similarly, the "orthophosphate" for the purposes of this specification and the appended claims can be an acid orthophosphate or a completely neutralized orthophosphate. The cationic radical of the salt can be sodium or potassium. The $R_2O$ to $P_2O_5$ ratio of the mixture of phosphates is a well known method of designating the nature of the phosphate or mixtures thereof. To illustrate this point, tetrasodium pyrophosphate and monosodium orthophosphate will be resolved into their respective $R_2O$ to $P_2O_5$ ratios. The following equations illustrate the manner by which the $R_2O$ to $P_2O_5$ ratios are determined.

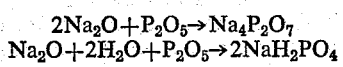

$$2Na_2O + P_2O_5 \rightarrow Na_4P_2O_7$$
$$Na_2O + 2H_2O + P_2O_5 \rightarrow 2NaH_2PO_4$$

The moles of $Na_2O$ and water provide the total number of moles of $R_2O$ and the number of moles of $P_2O_5$ required to produce the desired phosphate are used in the calculation of the $R_2O$ to $P_2O_5$ ratio. From the equations given above, it is apparent that the $R_2O$ to $P_2O_5$ ratio for tetrasodium pyrophosphate is 2 to 1 whereas the ratio for monosodium orthophosphate is 3 to 1. In the present invention, the relative amounts of pyrophosphate and orthophosphate provide a mixture having a $R_2O$ to $P_2O_5$ ratio of about 2.45 to 2.60:1. We have found quite unexpectedly that the phosphate mixture having the required $R_2O$ to $P_2O_5$ ratio produces exceptional results in regard to meat curing. The R of the $R_2O$ represents sodium, potassium or hydrogen, however, when R is only hydrogen, the phosphate is an acid and therefore is not suitable for the purposes of this invention. The pH of the curing composition is about 6 to 7.5, and preferably about 6 to about 6.6 and, therefore, the phosphate mixture must contain sodium or potassium as the cationic radical of the desired phosphate salts. Specific examples of phosphate mixtures which can be used for the purpose of this invention are (a) 1 mole disodium acid pyrophosphate and 1 mole trisodium phosphate and (b) 1 mole tetrasodium pyrophosphate and 1 mole monosodium orthophosphate.

The mixture of phosphates comprises not more than about 5% by weight of the total curing solution, more usually about 1 to 5% by weight, and preferably about 3 to 4.5% by weight on the same basis. The quantity of phosphate mixture is sufficient to provide a meat product containing not more than about 0.6% by weight of phosphate, and more usually about 0.1 to 0.5% by weight of phosphate in the finished product. In preparing the curing solution, it is preferred that an aqueous solution of phosphates be made as a separate operation. The preferred procedure is to add an aliquot portion of the desired amount of orthophosphate and pyrophosphate to water and agitate to dissolve completely the same. This procedure is repeated until the required amount of phosphates is in solution. We have found that the phosphates are easily dissolved in this manner and are stable in commercial operations. The temperature at which the solution of phosphates is prepared falls within the range of about 38° to 130° F., preferably about 60° to 100° F. When the quantity of pyrophosphate is relatively large, it is preferred to employ higher temperatures in the preparation of the aqueous solution of phosphates. Conversely, low temperatures in the range are preferred when the orthophosphate is relatively large.

The aqueous solution of phosphates is combined with other ingredients to make up the curing solution. The curing solution contains a nitrite of sodium or potassium; a nitrate of sodium or potassium; sodium chloride; sugar e.g. sucrose, dextrose, etc. and spices when desired. Potassium or sodium nitrite is effective in fixing color by reacting with hemoglobin or myoglobin in the meat. Usually sodium or potassium nitrate is added to the curing solution to insure the presence of nitrite for color fixation. Generally, the nitrite is present in the curing solution in the amount of about 0.05 to 0.2% of the curing solution, and similarly, the amount of nitrate varies over the same range. Common salt or sodium chloride is also added to the curing solution in a quantity of about 10 to 18% by weight of the curing solution. Usually about 3 to 5% by weight of sugar is added to the curing solution. The combination of ingredients provides a curing solution having a pH of about 6 to 7.5 preferably about 6 to 6.6. The pH of the curing solution is equal to or greater than the pH of the meat being cured. For example, if the meat being cured has a pH of 5.9, the curing solution has a pH which is greater e.g. about 6.2. It is preferred that the curing solution has a pH which is at least about .3 unit greater than the pH of meat, or usually about .3 to .7 unit greater than the pH of meat.

A method of conducting the curing operation is by injecting the curing solution into the arterial system of the meat or by multiple injection into the muscle of the meat so as to attain uniform distribution of the curing solution throughout the meat. In general, the curing operation is effected at a temperature of about 36° to 130° F. The temperature of curing is preferably selected on a basis of the type of phosphate mixture which is being used. When the pyrophosphate is relatively larger in amount, higher temperatures are preferred for the curing operation. Conversely, lower curing temperatures are preferred for curing involving a phosphate mixture having a relatively larger quantity of orthophosphate. To minimize microbial growth, it is preferred to employ a curing temperature of about 38° to 60° F. For such a curing temperature, the phosphate mixture is preferably one containing an $R_2O$ to $P_2O_5$ ratio of about 2.5 to 1. Following the injection of curing solution into the meat, it may be immediately subjected to smoking or cooking treatment, however, for commercial practice it is preferred that following the curing treatment the meat is allowed to stand for at least one day and up to one week in order to insure adequate distribution of the curing solution throughout the meat. After the meat is cured, it is smoked in the usual manner by subjecting the same to a temperature of about 120° to 180° F. and for a period of about 5 to 30 hours. Instead of smoking, the meat may be boned and placed in a can, mold, or fibrous container and cooked to an internal temperature sufficient to coagulate the meat protein.

In order to provide a better understanding of this invention, the following example of a commercial operation is given.

1350 lbs. of tetrasodium pyrophosphate and monosodium orthophosphate in the weight ratio of 2 to 1 of the former to the latter were thoroughly mixed in 1700 gallons of water. Solution of the phosphates in water took place at a temperature of about 60–70° F. Usually the solution temperature will vary from 60–85° F. The phosphates were dissolved in water by adding 100 lbs. monosodium orthophosphate and 200 lbs. of tetrasodium pyrophosphate to the desired amount of water and agitating until complete solution was obtained; this procedure was followed until the entire desired amount of phosphates was added. A chilled solution of brine or sodium chloride was added in a separate operation to a large tank in an amount to provide a final curing solution containing 15% by weight of sodium chloride. Simultaneously water was added to the large tank in the required amount. Sugar was added to the large tank in a quantity to provide a curing solution containing 3% by weight of the same. The aqueous mixture in the large tank was agitated and during agitation the aqueous solution of phosphates was added to the large tank. Thereafter, 24 lbs. of sodium nitrate and 64 lbs. of sodium nitrite were added to the large tank and the entire mixture was agitated for a period of one-half hour. The curing solution was ready for use and due to the chilled brine, the temperature thereof was about 48–53° F.

A series of tests were performed on canned hams in order to evaluate the use of our phosphate mixture with sodium carbonate and typical phosphates which have been used commercially.

The basic curing solution contained the following ingredients.

| | Wt. percent |
|---|---|
| NaCl | 15 |
| $NaNO_2$ | 0.17 |
| $NaNO_3$ | 0.06 |
| Sugar | 3.0 |
| Water | Balance |

A ham for canning was arterially injected with the aforedescribed curing solution. It was then held in a salt solution containing 10% sodium chloride and .12% sodium nitrite, for a period of 3 days. The ham was removed from the curing solution, surplus fat and skin were removed. It was then boned, placed in a can and sealed under vacuum. The can was then cooked in water at a temperature of 165° for 4 hours. After cooking, it was chilled in water and transferred to a refrigerator. The ham was removed from the can and inspected for texture, flavor, color and cook out. It was found that the juices amounted to 14% by weight of the canned weight of the ham. The ham had a pinkish color characteristic of a cured ham which is highly desirable from the standpoint of consumer appeal. The ham had an excellent, fine fibrous texture with an excellent canned ham flavor.

Following the procedure outlined above, the curing solution was modified by the addition of various alkaline agents or phosphates in accordance with the quantities listed below.

Example II—4.5% by weight sodium hexametaphosphate.
Example III—1% by weight sodium carbonate.
Example IV—3.5% by weight sodium tripolyphosphate.
Example V—3.5% of 1:1 molar ratio of tetrasodium pyrophosphate and monosodium orthophosphate.

The percent cook out for these runs is tabulated below.

| | Percent |
|---|---|
| Example II | 11.3 |
| Example III | 10.4 |
| Example IV | 9.2 |
| Example V | 5.7 |

Upon inspection of the hams of Examples II–IV inclusive, it was found that each ham had an intensified reddish color which imparted an artificial appearance thereto. Additionally, each ham had a gelatinous texture which created the effect of a raw or undercooked condition. The flavor of these hams was not as good as the control ham which had been cured without the use of any alkaline or phosphate material. By comparison, the ham in Example V possessed all of the characteristics of the ham which was cured without the use of an alkaline or phosphate material. This result is unexpected, because heretofore the use of an alkaline or phosphate material in curing solutions gave the undesired effects which are noted here above in Examples II–IV inclusive. Furthermore, we were surprised to find that the cook-out in the practice of our invention is significantly less than is obtained with the use of other alkaline or phosphate materials as exemplified by Examples II–IV inclusive.

Having thus provided a written description of our invention, it should be understood that no undue limitations are to be imposed by reason of the specific examples, but that the present invention is defined by the appended claims.

We claim:

1. The composition comprising about 0.05 to 0.2% by weight of a nitrite of a metal selected from the group consisting of sodium and potassium, about 1 to 5% by weight of a mixture of a pyrophosphate and an orthophosphate having an $R_2O$ to $P_2O_5$ ratio of 2.45 to 2.60:1 wherein R is selected from the group consisting of sodium, potassium and hydrogen about 3 to 5% by weight of sugar, about 10 to 18% by weight of sodium chloride and the balance water and the composition has a pH of about 6.0 to 7.5.

2. The composition of claim 1 wherein the pyrophosphate is tetrasodium pyrophosphate and the orthophosphate is monosodium orthophosphate.

3. The composition of claim 1 being further characterized by containing about 0.05 to 0.2% by weight of nitrate of a metal selected from the group consisting of sodium and potassium.

4. A composition comprising about 0.05 to 0.2% by weight of sodium nitrite, about 3 to 4.5% by weight of a mixture of tetrasodium pyrophosphate and monosodium orthophosphate having an $R_2O$ to $P_2O_5$ ratio of 2.5:1, about 3 to 5% by weight of sugar about 10 to 18% by weight of sodium chloride and the composition having a pH of about 6.0 to 6.6.

5. The process of curing meat which comprises subjecting meat at a temperature of about 36° to 130° F. to a curing solution containing about 0.05 to 0.2% of a nitrite of a metal selected from the group consisting of sodium and potassium about 1 to 5% by weight of a mixture of pyrophosphate and an orthophosphate having an $R_2O$ to $P_2O_5$ ratio of about 2.45 to 2.60:1 and wherein R is selected from the group consisting of sodium, potassium and hydrogen, about 3 to 5% by weight of sugar and about 10 to 18% by weight of sodium chloride, the curing solution having a pH of about 6.0 to 7.5.

6. The process of claim 5 wherein the meat is a canned ham.

7. A process of curing meat which comprises subjecting meat at a temperature of about 36° to 60° F. to a curing solution containing about 0.05 to 0.2% of a nitrite of a metal selected from sodium and potassium, about 3 to 4.5% of a mixture of a pyrophosphate and an orthophosphate having an $R_2O$ to $P_2O_5$ ratio of about 2.45 to 2.60:1 wherein R is selected from sodium, potassium and hydrogen, about 10 to 18% sodium chloride, about 3 to 5% by weight of sugar and the curing solution has a pH of about 6 to 6.6.

8. The process of claim 7 wherein the meat is a canned ham.

9. A process of curing pork which comprises subjecting the pork at a temperature of about 38° to 60° F. to a curing solution of about 0.05 to 0.2% sodium nitrite, about 3.0 to 4.5% of tetrasodium pyrophosphate and monosodium orthophosphate having an $R_2O$ to $P_2O_5$ ratio of 2.5:1, about 10 to 18% sodium chloride, about 3 to 5% by weight of sugar and the curing solution has a pH of about 6 to 6.6.

10. The process of claim 9 wherein the pork is a canned ham.

References Cited in the file of this patent

UNITED STATES PATENTS

| | | |
|---|---|---|
| 2,513,094 | Hall | June 27, 1950 |
| 2,735,776 | Bickel | Feb. 21, 1956 |
| 2,812,262 | Wasserman | Nov. 5, 1957 |

FOREIGN PATENTS

| | | |
|---|---|---|
| 696,617 | Great Britain | Sept. 2, 1953 |

OTHER REFERENCES

Food Technology, 1956, vol. X, No. 11, pp. 546 to 552, inclusive, article entitled "The Action of Phosphates in Sausage Products," by C. E. Swift et al.